(12) United States Patent
Kim (10) Patent No.: US 11,440,422 B2
(45) Date of Patent: Sep. 13, 2022

(54) CHARGING CONTROL DEVICE FOR ELECTRIC VEHICLE

(71) Applicant: LG INNOTEK CO., LTD., Seoul (KR)

(72) Inventor: Hyoung Dong Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 79 days.

(21) Appl. No.: 16/969,421

(22) PCT Filed: Feb. 13, 2019

(86) PCT No.: PCT/KR2019/001768
§ 371 (c)(1),
(2) Date: Aug. 12, 2020

(87) PCT Pub. No.: WO2019/160330
PCT Pub. Date: Aug. 22, 2019

(65) Prior Publication Data
US 2021/0053453 A1 Feb. 25, 2021

(30) Foreign Application Priority Data
Feb. 13, 2018 (KR) .................. 10-2018-0017829

(51) Int. Cl.
*B60L 53/18* (2019.01)
*B60L 53/66* (2019.01)
(Continued)

(52) U.S. Cl.
CPC ............ *B60L 53/18* (2019.02); *B60L 53/66* (2019.02); *G06F 1/26* (2013.01); *H02J 7/0036* (2013.01); *B60Y 2200/91* (2013.01)

(58) Field of Classification Search
CPC ........ B60L 53/18; B60L 53/66; B60L 53/305; B60L 53/14; G06F 1/26; H02J 7/0036;
(Continued)

(56) References Cited

U.S. PATENT DOCUMENTS

| 4,654,573 A * | 3/1987 | Rough ................. B60L 53/122 320/108 |
| 6,586,911 B1 * | 7/2003 | Smith ............... H04W 52/0277 320/134 |

(Continued)

FOREIGN PATENT DOCUMENTS

| EP | 2 767 430 A1 | 8/2014 |
| EP | 3 581 431 A1 | 12/2019 |

(Continued)

OTHER PUBLICATIONS

International Search Report, issued in PCT/KR2019/001768, dated May 24, 2019.

*Primary Examiner* — Stacy Whitmore
(74) *Attorney, Agent, or Firm* — Birch, Stewart, Kolasch & Birch, LLP (57) ABSTRACT

The embodiment relates to a charging control device for an electric vehicle. An electric vehicle charging control device according to an embodiment includes: a charge sequence port to which a charging sequence signal is input from a connector of a charging cable; a first power supply for supplying a first driving voltage; a first controller which is driven on the basis of the first driving voltage, repeats a wake-up state and a sleep state periodically, and generates a wake-up signal when the charging sequence signal is input to the charge sequence port in a wake-up state; a second controller for maintaining a sleep state and operating in a wake-up state when the wake-up signal is generated during the maintaining of the sleep state, and for controlling a charging operation of the electric vehicle in the wake-up state; and a second power supply, disposed between the first controller and the second controller, for providing a second driving voltage to the second controller when the wake-up signal is generated, wherein the charging sequence signal is (Continued)

selectively received in the wake-up state of the first controller.

10 Claims, 6 Drawing Sheets

(51) Int. Cl.
    *G06F 1/26*     (2006.01)
    *H02J 7/00*     (2006.01)

(58) Field of Classification Search
    CPC . B60Y 2200/91; Y02T 10/70; Y02T 10/7072; Y02T 90/12; Y02T 90/14; Y02T 90/16
    See application file for complete search history.

(56) References Cited

U.S. PATENT DOCUMENTS

| | | | |
|---|---|---|---|
| 10,259,328 B2* | 4/2019 | Hayashizaki | B60L 50/60 |
| 10,286,800 B2* | 5/2019 | DeDona | B60L 3/00 |
| 10,668,820 B2* | 6/2020 | Konishi | H02J 7/0013 |
| 11,180,034 B2* | 11/2021 | Reynolds | H02J 7/0047 |
| 11,192,457 B2 | 12/2021 | Kim | |
| 2012/0032634 A1 | 2/2012 | Cavanaugh | |
| 2013/0127418 A1 | 5/2013 | Oh et al. | |
| 2013/0320922 A1* | 12/2013 | Acena | B60L 53/66 320/109 |
| 2014/0232355 A1 | 8/2014 | Masuda et al. | |
| 2017/0141613 A1* | 5/2017 | Oshima | H02J 7/0042 |
| 2017/0182893 A1* | 6/2017 | Hayashizaki | B60L 53/14 |
| 2017/0361791 A1* | 12/2017 | Yoon | H02J 7/0077 |
| 2019/0184849 A1* | 6/2019 | Lim | B60L 53/62 |
| 2019/0252735 A1* | 8/2019 | Sung | H01M 10/42 |
| 2019/0351775 A1* | 11/2019 | Jang | B60L 53/62 |
| 2020/0009981 A1* | 1/2020 | Kim | B60L 50/60 |
| 2020/0276908 A1* | 9/2020 | Lim | B60L 3/00 |
| 2020/0377055 A1* | 12/2020 | Ando | B60W 60/0016 |
| 2021/0094430 A1* | 4/2021 | Shin | G01R 31/68 |
| 2021/0394628 A1* | 12/2021 | Gomez Puerto | B60L 53/66 |
| 2021/0394723 A1* | 12/2021 | Decker, Jr. | B60T 8/1708 |
| 2021/0397182 A1* | 12/2021 | Dundorf | B64D 47/08 |

FOREIGN PATENT DOCUMENTS

| | | |
|---|---|---|
| KR | 10-1997-0036352 A | 7/1997 |
| KR | 10-2007-0121332 A | 12/2007 |
| KR | 10-2014-0031500 A | 3/2014 |
| KR | 10-2017-0094869 A | 8/2017 |
| WO | WO 2012/018204 A2 | 2/2012 |

* cited by examiner

CHARGING CONTROL DEVICE FOR ELECTRIC VEHICLE

CROSS REFERENCE TO RELATED APPLICATIONS

This application is the National Phase of PCT International Application No. PCT/KR2019/001768, filed on Feb. 13, 2019, which claims priority under 35 U.S.C. 119(a) to Patent Application No. 10-2018-0017829, filed in the Republic of Korea on Feb. 13, 2018, all of which are hereby expressly incorporated by reference into the present application.

TECHNICAL FIELD

The embodiment relates to a charging control device and a charging control method for an electric vehicle.

BACKGROUND ART

Eco-friendly vehicles, such as an electric vehicle (EV) or a plug-in hybrid electric vehicle (PHEV), use an electric vehicle supply equipment (EVSE) installed at a supply to charge a battery.

To this end, an electric vehicle charging controller (EVCC) is mounted in the EV, communicates with the EV and the EVSE, and controls charging of the EV.

For example, when the EVCC receives a charging sequence signal for starting charging from the EVSE, it may control so as to start charging, and when the EVCC receives a charging sequence signal for stopping charging from the EVSE, it may control so as to end charging.

However, when the EV received the charging sequence signal, it had to operate an MCU of the EVCC at all times to start charging. The MCU of the EVCC consumes a significant amount of battery power. Accordingly, there was a problem that current is unnecessarily wasted until charging power is provided from the EVSE.

Technical Problem

An embodiment has been devised to solve problems of the related art described above, and an object of the embodiment is to provide a charging control device and a charging control method for an electric vehicle.

In addition, the embodiment provides a charging control device and a charging control method of an electric vehicle that minimizes current consumed by the charging control device while the electric vehicle is not being charged.

Technical Solution

A charging control device for an electric vehicle according to an embodiment includes: a charge sequence port to which a charging sequence signal is input from a connector of a charging cable; a first power supply providing a first driving voltage; a first controller driven based on the first driving voltage, periodically repeating a wake-up state and a sleep state, and generating a wake-up signal when the charging sequence signal is input to the charge sequence port in the wake-up state; a second controller operating in the wake-up state when the wake-up signal is generated during maintaining of the sleep state, and controlling a charging operation of the electric vehicle in the wake-up state; and a second power supply disposed between the first controller and the second controller, and providing a second driving voltage, wherein the second power supply provides the second driving voltage to the second controller when the wake-up signal is generated.

In addition, a cycle of the first controller includes a first period and a second period, the first period is a period in which the first controller is in the sleep state, and the second period is a period in which the first controller is in the wake-up state.

Further, the first period is longer than the second period.

In addition, the charging control device further includes an opto-coupler disposed between the charge sequence port and the first power supply and driven based on the first driving voltage, wherein the opto-coupler provides the charging sequence signal to the first controller when the charging sequence signal is input.

Further, the opto-coupler provides the charging sequence signal to the second controller when the charging sequence signal is input.

In addition, the charging control device further includes a coupler switch disposed between the opto-coupler and the first power supply and turned on/off according to the control of the first controller.

In addition, the first controller turns on/off the coupler switch periodically.

Further, a cycle of turning on/off the coupler switch and a cycle of the wake-up/sleep state of the first controller are the same.

Advantageous Effects

Effects of a charging control device and a charging control method for an electric vehicle according to an embodiment will be described as follows.

In addition, the embodiment may minimize current consumed by the charge control device while the EV is not being charged.

In addition, the embodiment may minimize current in a sleep state of the MCU of the EVCC.

In addition, the embodiment may slow down a discharging speed of a battery.

The effects expected in the embodiment are not limited to the above-mentioned effects, and other effects not mentioned will be clearly understood by a person having an ordinary skill in the art to which the embodiment pertains, from the following descriptions.

DESCRIPTION OF DRAWINGS

The accompanying drawings are to help understanding of the embodiment, and provide embodiments of the embodiment in conjunction with the detailed description. However, the technical features of the embodiment are not limited to specific drawings, and features disclosed in the drawings may combine with each other to form a new embodiment.

MODES OF THE INVENTION

Hereinafter, embodiments related to the present invention will be described in detail with reference to the accompanying drawings. The component suffixes "module" and "part" used in the following description are given or mixed together only considering the ease of creating the specification, and have no meanings or roles that are distinguished from each other by themselves.

Advantages and features of the present invention, and methods for achieving them will be apparent with reference to the embodiments described below in detail with reference to the accompanying drawings. However, the present invention is not limited to the embodiments disclosed below, but may be implemented in various forms, and only the embodiments of the present invention make the disclosure of the present invention complete, and are provided to fully convey the scope of the present invention to those skilled in the art to which the present invention belongs, and the present invention is defined only by the scope of the claims. Like reference numerals refer to like elements throughout the specification.

In describing the embodiments of the present invention, when it is determined that a detailed description of a well-known function or a configuration may unnecessarily obscure the gist of the present invention, the detailed description thereof will be omitted. Terms to be described below are terms defined in consideration of functions in the embodiments of the present invention, and may vary according to intentions or customs of users or operators. Therefore, the definition should be made based on the contents throughout the present specification.

Combinations of each block in the accompanying drawings and each step of the flowchart may be performed by computer program instructions. These computer program instructions may be mounted on a processor of a general purpose computer, a special purpose computer, or other programmable data processing equipment, and thus the instructions performed by the processor of the computer or other programmable data processing equipment create means for performing the functions described in each block of the drawing or each step of the flowchart. These computer program instructions may also be stored in a computer usable or computer readable memory capable of directing the computer or other programmable data processing equipment to implement a function in a particular manner, and thus the instructions stored in the computer usable or computer readable memory may also produce a manufactured item containing instruction means for performing the functions described in each block of the drawings or each step of the flowchart. The computer program instructions may also be mounted on the computer or other programmable data processing equipment, and thus the instructions for performing the computer or other programmable data processing equipment by performing a series of operating steps on the computer or other programmable data processing equipment to create a computer-implemented process, may also provide steps for performing the functions described in each block of the drawings and each step of the flowchart.

In addition, each block or each step may represent a module, segment or a portion of code that includes one or more executable instructions for performing specified logical function(s). It should also be noted that in some alternative embodiments, the functions noted in the blocks or steps may occur out of order. For example, two blocks or steps shown in succession may be performed substantially simultaneously, or the blocks or steps may sometimes be performed in reverse order depending on the corresponding function.

Figure 1:
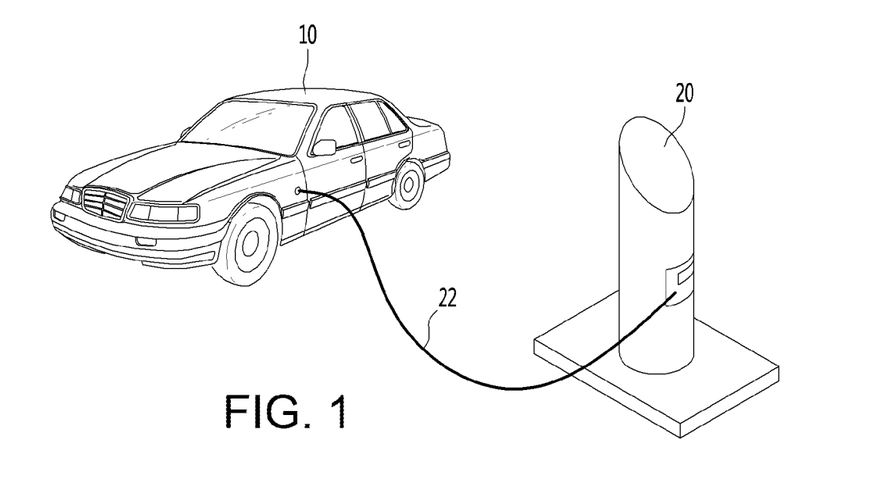
FIGS. 1 to 3 are views showing a charging system of an electric vehicle according to an embodiment.
Figure 2:
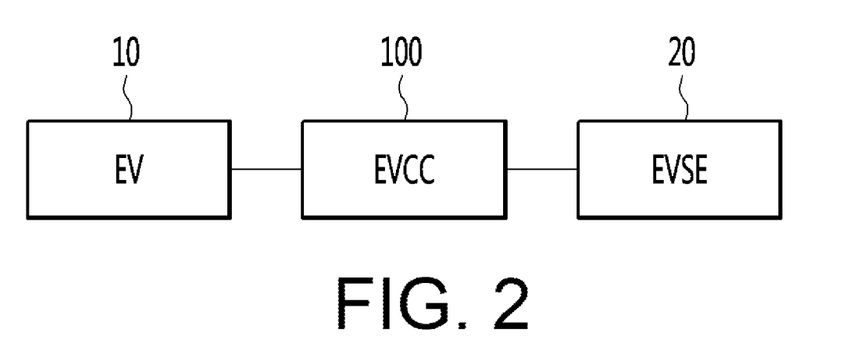
Figure 3:
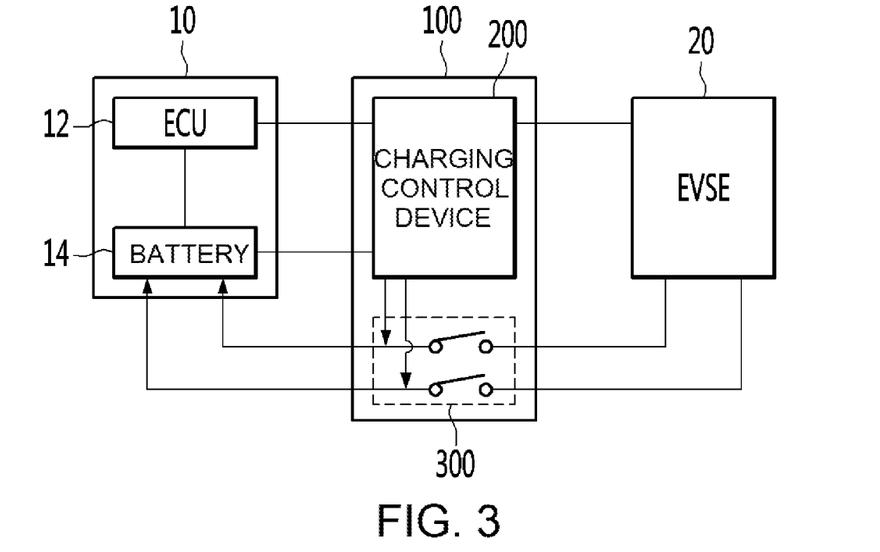

FIGS. 1 to 3 are views showing a charging system of an electric vehicle according to an embodiment.

Referring to FIGS. 1 to 3, an electric vehicle (EV) 10 may be charged by an electric vehicle supply equipment (EVSE) 20. To this end, a charging cable 22 connected to the EVSE 20 may be connected to an oil inlet port of the EV 10. Here, the EVSE 20 is an apparatus that supplies an alternating current (AC) or direct current (DC), and may be disposed at a supply or home, or may also be portably implemented. The EVSE 20 may also be referred to as a supply, an AC supply, a DC supply, a socket-outlet, or the like.

An electric vehicle charging controller (EVCC) 100 is mounted in the EV 10 and connected to the EV 10. For example, the EVCC 100 may be installed in a trunk of the EV 10, but is not limited thereto.

Here, the EVCC 100 may communicate with the EV 10 and the EVSE 20, respectively.

According to the embodiment, the EVCC 100 includes a charging control device 200 and a power supply 300.

The charging control device 200 is connected to the EV 10 and the EVSE 20, respectively. The charging control device 200 may be connected to the EV 10 and the EVSE 20 through a plurality of pins, respectively.

For example, the charging control device 200 may include 20 pins connected to the EVSE 20, and may communicate with the EVSE 20 through the 20 pins. For example, one among the 20 pins may be a pin for a control pilot (CP) port for receiving a CP signal from the EVSE 20, another one may be a pin for a proximity detection (PD) port for detecting whether a connector of the charging cable is in proximity, still another one may be a pin for a charge sequence (CS) port for receiving a CS signal from the EVSE 20, and still another one is may be a pin for a protective earth (PE) port connected to a ground of the EVSE 20. Another one among the 20 pins may be a pin for driving a motor to open a flap of an inlet port, still another one may be a pin for sensing the motor, still another one may be a pin for sensing a temperature, still another one may be a pin for sensing a light-emitting diode (LED), and still another one may be a pin for controller area network (CAN) communication. However, a number and function of the pins are not limited thereto, and may be variously modified.

In addition, the charging control device 200 may include 12 pins connected to the EV 10, and may communicate with the EV 10 through the 12 pins. For example, one among the 12 pins may be a pin for a voltage line applied from a collision detection sensor in the EV 10, another one may be a battery pin in the EV 10, still another one may be a pin for may communication, still another one may be a pin connected to a ground, and still another one may be a pin for high voltage protection. However, a number and function of the pins are not limited thereto, and may be variously modified.

Two high voltage lines of the EVSE 20 supply power to a battery 14 of the EV 10 by the power supply 300 of the EVCC 100, and at this time, turn-on and turn-off of the high voltage lines may be controlled by the charging control device 200.

That is, the charging control device 200 may communicate with an electric controller (ECU) 12 of the EV 10, and may control the power supply 300 that transmits the power supplied from the EVSE 20 to the battery 14 of the EV 10 according to signals received from the EV 10 and the EVSE 20, respectively.

Figure 4:
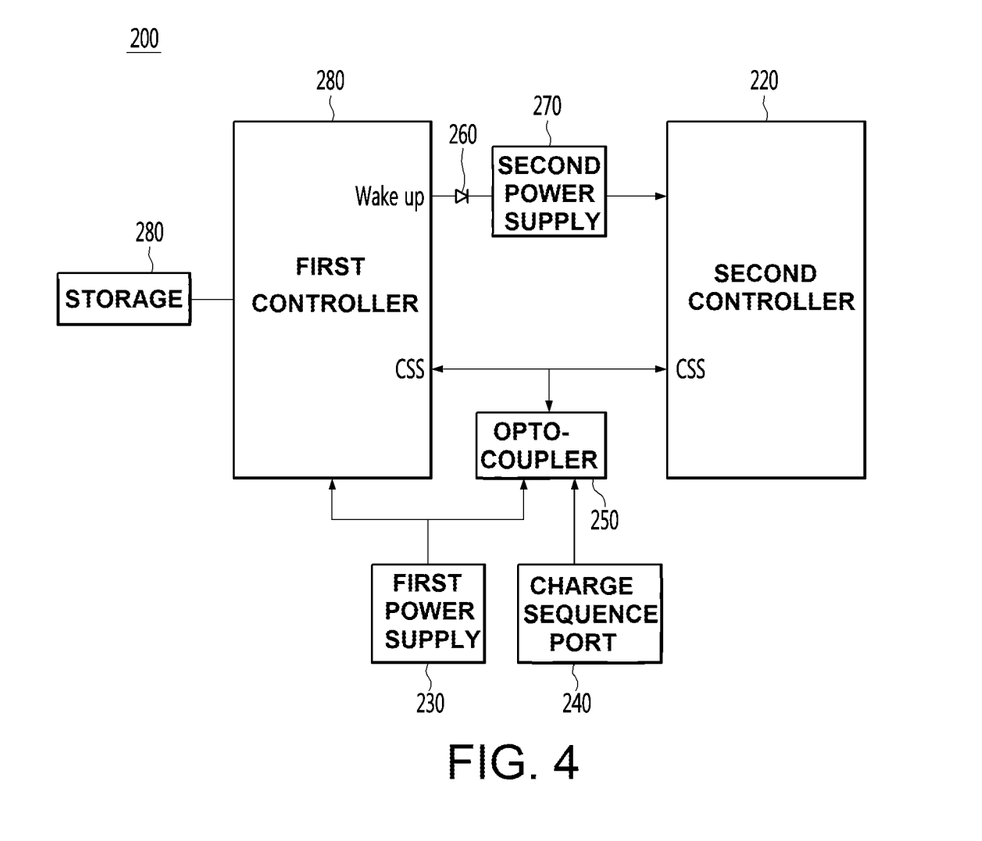
FIG. 4 is a block diagram of a charging control device according to one embodiment.

FIG. 4 is a block diagram of a charging control device according to one embodiment.

Referring to FIG. 4, a charging control device 200 according to one embodiment may include a first controller 210 and a second controller 220. In the present specification, the first controller 210 may be referred to as a submicrocontroller (sub-MCU), an auxiliary controller, an auxiliary controller, and the like, and the second controller 220 may be referred to as a main microcontroller (main MCU), a primary controller, and a primary controller. Here, the MCU may refer to a computer in which a microprocessor and input and output modules are integrated in one chip to perform a predetermined function. When the MCU is applied in a vehicle, it may be implemented as a device such as an electronic controller (ECU), and an automobile engine, an automatic transmission, and various parts of an anti-lock braking system (ABS) may be controlled by the computer. The MCU according to one embodiment may be applied in the charging control device 200 for charging the EV, and may be divided into the sub-MCU and the main MCU.

In general, the MCU applied in the charging control device 200 controls the charging of the EV as a whole, and thus power consumption may be increased. Since the MCU uses a battery voltage of the EV, the power consumption of the MCU may be a very big issue. According to the embodiment to solve such an issue, the sub-MCU which is the first controller 210 may be a unit that is separated from the main MCU which is the second controller 220. The first controller 210 may operate the second controller 220 from a sleep state that does not consume current to a wake-up state, and when operating in the wake-up state, the second controller 220 may use the battery voltage to perform overall charging control.

The first controller 210 periodically detects a charging sequence signal, and when the charging sequence signal is detected, the second controller 220 may operate from the sleep state to the wake-up state. More specifically, the first controller 210 may repeat the wake-up state and the sleep state periodically. A cycle may be set arbitrarily. In addition, the cycle may include a first period and a second period. The first period may be a period in which the first controller 210 is in the sleep state. The second period may be a period in which the first controller 220 is in the wake-up state. The first period may be larger than the second period. For example, the first period may be 500 ms and the second period may be 50 ms. In addition, the first controller 210 does not drive during the first period which is the sleep state, and may not perform an operation of detecting the charging sequence signal. That is, the first controller 210 may not consume current during the first period. The first controller 210 may be driven based on a first driving voltage of a first power supply 230 during the second period which is the wake-up state, and may perform an operation of detecting a charging sequence signal (CSS) provided by an opto-coupler 250. That is, the first controller 210 may consume current during the second period. In addition, when the first controller 210 detects the CSS while operating during the second period of one cycle, the first controller 210 may generate a wake-up signal for waking up the second controller 220. The first controller 1210 may provide the wake-up signal to a second power supply 270.

The second controller 220 may be in a sleep state before starting the charging control. The second controller 220 may not consume current in the sleep state. The second controller 220 may operate in a wake-up state when the first controller 210 generates the wake-up signal, and may perform an operation for controlling charging of the EV as a whole. The second controller 220 may consume current in the wake-up state. More specifically, when the first controller 210 generates the wake-up signal, the wake-up signal may activate the second power supply 270. The activated second power supply 270 may provide a second driving voltage to the second controller 220, and the second controller 220 may operate in the wake-up state by the second driving voltage. In addition, the second controller 220 may confirm the CSS provided by the opto-coupler 250 when entering the wake-up state to perform the charge control operation.

The charging control device 200 according to one embodiment may include the first power supply 230. The first power supply 230 may provide the first driving voltage to the first controller 210 based on power provided from a battery 14. In addition, the first power supply 230 may provide the first driving voltage to the opto-coupler 250 based on the power provided from the battery 14.

The charging control device 200 according to one embodiment may include a charge sequence port 240. The charge sequence port 240 may receive the CSS from a charge cable.

The charging control device 200 according to one embodiment may include may include the opto-coupler 250. The opto-coupler 250 may operate based on the first driving voltage provided from the first power supply 230. An opto-coupler may be referred to as a photo coupler. The opto-coupler includes a light-emitting diode and a phototransistor, and the light-emitting diode emits light when a current is applied to the light-emitting diode. The phototransistor may receive the light emitted by the light-emitting diode to become conductive. Using such a principle, when the CSS provided from the charge sequence port 240 is sensed, the opto-coupler 250 may provide the CSS to the first controller 210. In addition, when the CSS provided from the charge sequence port 240 is sensed, the opto-coupler 250 may provide the CSS to the second controller 220.

The charging control device 200 according to one embodiment may include may include a diode 260. The diode 260 may be disposed between the first controller 210 and the second power supply 270. The diode 260 enables the wake-up signal provided from the first controller 210 to be provided to the second power supply 1270. In addition, the diode 260 may prevent a current generated at the second power supply 270 from flowing into the first controller 210.

The charging control device 200 according to one embodiment may include may include a storage 280. The storage 280 may include information related to a cycle of the first controller 210. That is, the storage 1280 may store the cycle information and information of the first period and the second period during one cycle.

Therefore, the embodiment may minimize current consumed by the charge control device while the EV is not being charged. Further, the embodiment may minimize current in the sleep state of the MCU of the EVCC. Furthermore, the embodiment may slow down the discharging speed of the battery.

Figure 5:
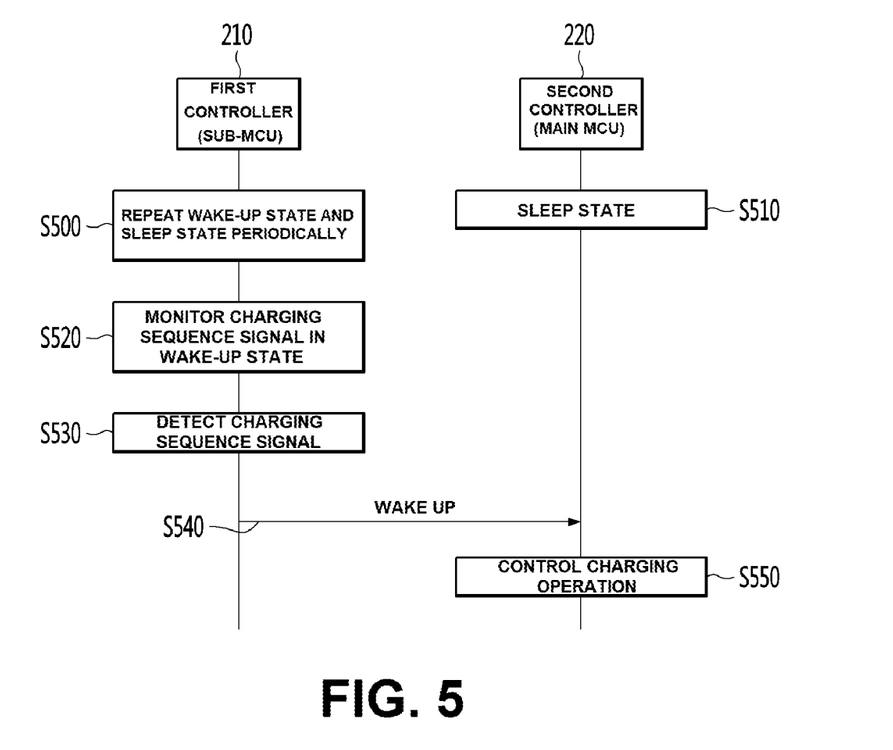
FIG. 5 is an example of an operation scenario of a charging control device according to one embodiment.

FIG. 5 is an example of an operation scenario of a charging control device according to one embodiment.

Referring to FIG. 5, in a state in which charging of the EV 10 is not started, the first controller 210 which is the sub-MCU, may repeat the wake-up state and the sleep state periodically (S500), and the second controller 220 which is the main MCU may be in the sleep state (S510). Accordingly, it is possible to reduce power consumption in the sub-MCU and prevent unnecessary power consumption in the main MCU.

The first controller 210 may monitor the CSS in the wake-up state (S520). When the first controller 210 detects the CSS, the first controller 210 may wake up the second controller 220 (S530 and S540).

The second controller 220 may control the charging operation when in the wake-up state (S550).

Figure 6:
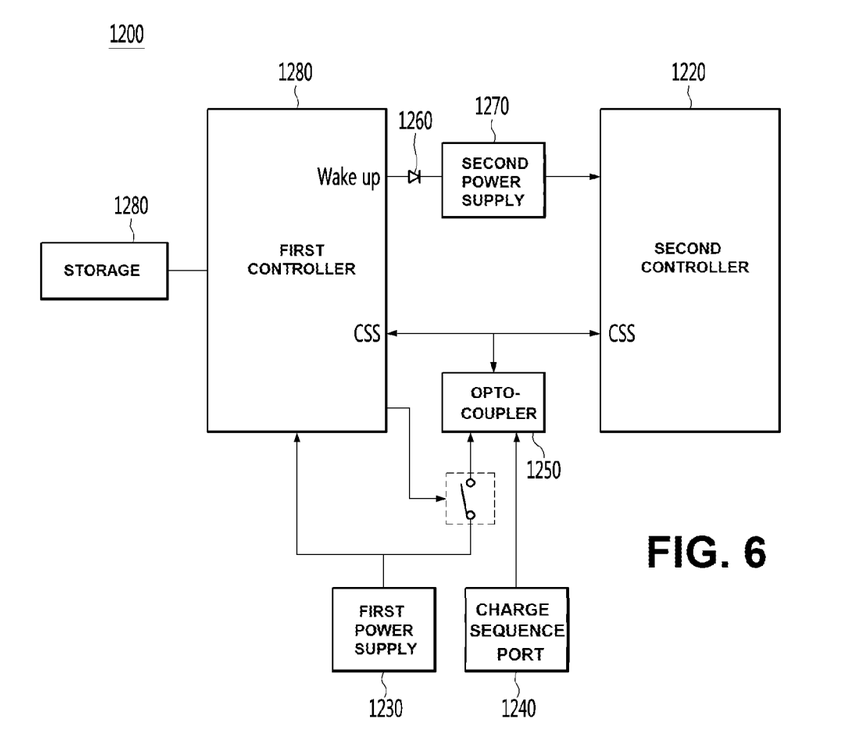
FIG. 6 is a block diagram of a charging control device according to another embodiment.

FIG. 6 is a block diagram of a charging control device according to another embodiment.

Referring to FIG. 6, a charging control device 1200 according to another embodiment may include a first controller 1210 and a second controller 1220. In the present specification, the first controller 1210 may be referred to as a submicrocontroller (sub-MCU), an auxiliary controller, an auxiliary controller, and the like, and the second controller 1220 may be referred to as a main microcontroller (main MCU), a primary controller, and a primary controller. Here, the MCU may refer to a computer in which a microprocessor and input and output modules are integrated in one chip to perform a predetermined function. When the MCU is applied in a vehicle, it may be implemented as a device such as an electronic controller (ECU), and an automobile engine, an automatic transmission, and various parts of an anti-lock braking system (ABS) may be controlled by the computer. The MCU according to one embodiment may be applied in the charging control device 1200 for charging the EV, and may be divided into the sub-MCU and the main MCU.

In general, the MCU applied in the charging control device 1200 controls the charging of the EV as a whole, and thus power consumption may be increased. Since the MCU uses a battery voltage of the EV, the power consumption of the MCU may be a very big issue. According to the embodiment to solve such an issue, the sub-MCU which is the first controller 1210 may be a unit that is separated from the main MCU which is the second controller 1220. The first controller 1210 may operate the second controller 1220 from a sleep state that does not consume current to a wake-up state, and when operating in the wake-up state, the second controller 1220 may use the battery voltage to perform overall charging control.

The first controller 1210 periodically detects a charging sequence signal, and when the charging sequence signal is detected, the second controller 1220 may operate from the sleep state to the wake-up state. More specifically, the first controller 1210 may repeat the wake-up state and the sleep state periodically. A cycle may be set arbitrarily. In addition, the cycle may include a first period and a second period. The first period may be a period in which the first controller 1210 is in the sleep state. The second period may be a period in which the first controller 1210 is in the wake-up state. The first period may be larger than the second period. For example, the first period may be 500 ms and the second period may be 50 ms. In addition, the first controller 1210 does not drive during the first period which is the sleep state, and may not perform an operation of detecting the charging sequence signal. That is, the first controller 1210 may not consume current during the first period. The first controller 1210 may be driven based on a first driving voltage of a first power supply 1230 during the second period which is the wake-up state, and may perform an operation of detecting a charging sequence signal (CSS) provided by an opto-coupler 1250. That is, the first controller 1210 may consume current during the second period. In addition, when the first controller 1210 detects the CSS while operating during the second period of one cycle, the first controller 1210 may generate a wake-up signal for waking up the second controller 1220. The first controller 1210 may provide the wake-up signal to a second power supply 1270. Further, the first controller 1210 may wake up the opto-coupler 1250 periodically. As an example, the cycle in which the first controller 1210 repeats the wake-up state and the sleep state and a cycle in which the opto-coupler 1250 repeats the wake-up state and the sleep state may be the same. That is, the first controller 1210 may wake up the opto-coupler 1250 in the first period, and may sleep the opto-coupler 1250 in the second period. As another example, the first controller 1210 may wake up the opto-coupler 1250 after a predetermined time has passed after being waked up in the first period, and may sleep the opto-coupler 1250 before a predetermined time at which the second period comes. In addition, the first controller 1210 may turn on a coupler switch 1290 to wake up the opto-coupler 1250. Further, the first controller 1210 may provide a coupler switch signal (SW) to the coupler switch 1290 to turn off the coupler switch 1290 in order to sleep the opto-coupler 1250. Therefore, the opto-coupler 1250 operates only while it is periodically waked up, so that current consumption is reduced.

Preferably, the first controller 1210 may turn on the coupler switch 1290 at a time of starting the operation in the wake-up state, and may turn off the coupler switch 1290 before a time of ending the wake-up state (before a time of starting the sleep state).

The second controller 1220 may be in a sleep state before starting the charging control. The second controller 1220 may not consume current in the sleep state. The second controller 1220 may operate in a wake-up state when the first controller 1210 generates the wake-up signal, and may perform an operation for controlling charging of the EV as a whole. The second controller 1220 may consume current in the wake-up state. More specifically, when the first controller 1210 generates the wake-up signal, the wake-up signal may activate the second power supply 1270. The activated second power supply 1270 may provide a second driving voltage to the second controller 1220, and the second controller 1220 may operate in the wake-up state by the second driving voltage. In addition, the second controller 1220 may confirm the CSS provided by the opto-coupler 1250 when entering the wake-up state to perform the charge control operation.

The charging control device 1200 according to another embodiment may include the first power supply 1230. The first power supply 1230 may provide the first driving voltage to the first controller 1210 based on power provided from a battery 14. In addition, the first power supply 1230 may provide the first driving voltage to the coupler switch 1290 based on the power provided from the battery 14.

The charging control device 1200 according to another embodiment may include a charge sequence port 1240. The charge sequence port 1240 may receive the CSS from a charge cable.

The charging control device 200 according to another embodiment may include the coupler switch 1290. The coupler switch 1290 may be disposed between the opto-couplers 1250 in the first power supply 1230. The coupler switch 1290 may be turned on or off based on the SW of the first controller 1210. As an example, the coupler switch 1290 is turned on when the SW for turning it on is input, and may provide the first driving voltage provided by the first power supply 1230 to the opto-coupler 1250. The coupler switch 1290 is turned off when the SW for turning it off is input, and may block such that the first driving voltage provided by the first power supply 1230 is not provided to the opto-coupler 1250.

The charging control device 1200 according to another embodiment may include the opto-coupler 1250. The opto-coupler 1250 may operate based on the first driving voltage provided from the first power supply 1230. An opto-coupler may be referred to as a photo coupler. The opto-coupler includes a light-emitting diode and a phototransistor, and the light-emitting diode emits light when a current is applied to the light-emitting diode. The phototransistor may receive the light emitted by the light-emitting diode to become conductive. Using such a principle, when the CSS provided from the charge sequence port 1240 is sensed, the opto-coupler 1250 may provide the CSS to the first controller 1210. In addition, the opto-coupler 1250 may be waked up periodically by the control of the first controller 1210. When the CSS provided by the charge sequence port 1240 is sensed while in the wake-up state, that is, while the first driving voltage is being provided, the opto-coupler 1250 may provide the CSS to the second controller 1220.

The charging control device 1200 according to another embodiment may include a diode 1260. The diode 1260 may be disposed between the first controller 1210 and the second power supply 1270. The diode 1260 enables the wake-up signal provided from the first controller 1210 to be provided to the second power supply 1270. In addition, the diode 1260 may prevent a current generated at the second power supply 1270 from flowing into the first controller 1210.

The charging control device 1200 according to another embodiment may include a storage 1280. The storage 1280 may include information related to a cycle of the first controller 1210. That is, the storage 1280 may store the cycle information of the first controller 1210 and information of the first period and the second period during one cycle. In addition, the storage 1280 may include information regarding a cycle of the opto-coupler 1250. That is, the storage 1280 may store the cycle information of the opto-coupler 1250 and the information of the first period and the second period during one cycle.

Therefore, the embodiment may minimize current consumed by the charge control device while the EV is not being charged. Further, the embodiment may minimize current in the sleep state of the MCU of the EVCC. Furthermore, the embodiment may slow down the discharging speed of the battery.

Figure 7:
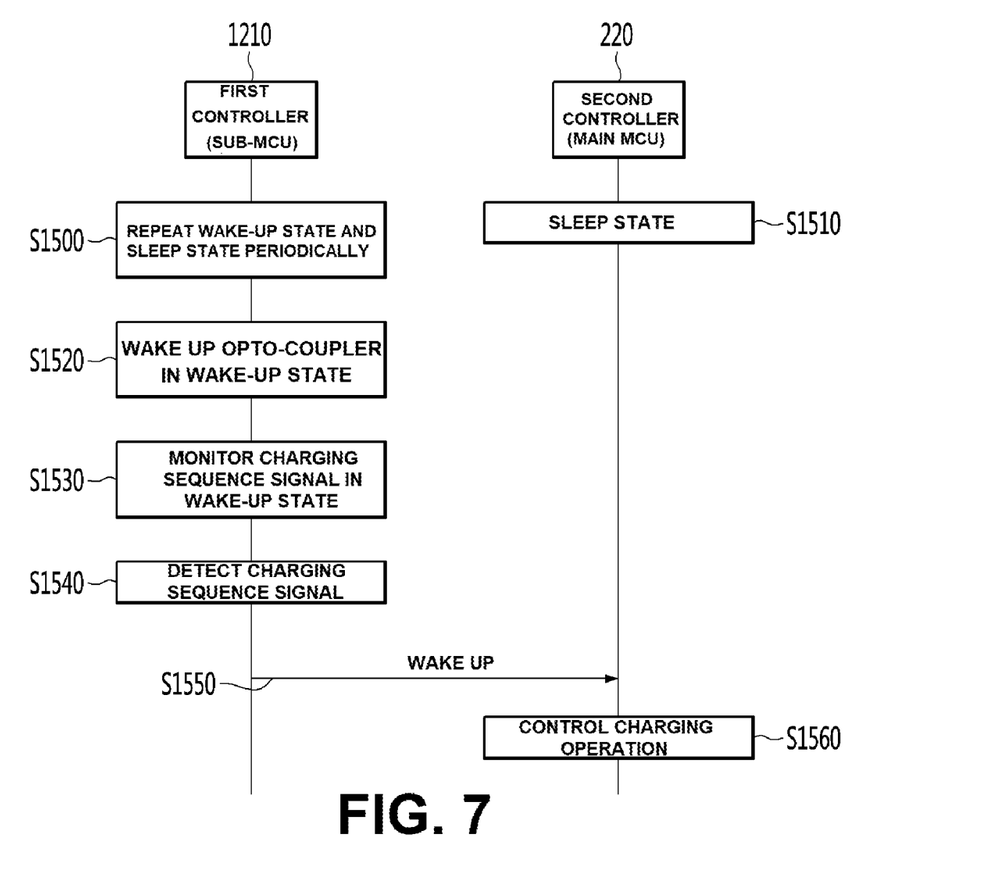
FIG. 7 is an example of an operation scenario of a charging control device according to another embodiment.

FIG. 7 is an example of an operation scenario of a charging control device according to another embodiment.

Referring to FIG. 7, in a state in which charging of the EV 10 is not started, the first controller 1210 which is the sub-MCU may repeat the wake-up state and the sleep state periodically (S1500), and the second controller 1220 which is the main MCU may be in the sleep state (S1510). Accordingly, it is possible to reduce power consumption in the sub-MCU and prevent unnecessary power consumption in the main MCU.

The first controller 1210 may wake up the opto-coupler in the wake-up state (S1520). Accordingly, power consumption of the opto-coupler may be reduced.

The first controller 1210 may monitor the CSS in the wake-up state (S1530).

When the first controller 1210 detects the CSS, the first controller 1210 may wake up the second controller 1220 (S1540 and S1550).

The second controller 1220 may control the charging operation when in the wake-up state (S1560).

According to one embodiment, the above-described method may be implemented as a processor readable code in a medium in which a program is recorded. Examples of a processor readable medium include a ROM, a RAM, a CD-ROM, a magnetic tape, a floppy disk, an optical data storage system, and the like, and include what is implemented in the form of carrier waves (for example, transmission through the Internet).

The embodiments described as above are not applicable to be limited to the configurations and methods described, and the embodiments may be configured by selectively combining all or some of the embodiments so that various modifications may be made.

In addition, preferred embodiments of the present invention are shown and described above, but the present invention is not limited to the specific embodiments described above, of course, various modifications may be made by those skilled in the art to which the invention belongs without departing from the gist of the present invention claimed in the claims, and such modifications should not be individually understood from the technological scope or the prospect of the present invention.

The invention claimed is:

1. A charging control device of an electric vehicle comprising:
    a charge sequence port to which a charging sequence signal is input from a connector of a charging cable;
    a first power supply configured to provide a first driving voltage;
    a first controller driven based on the first driving voltage, configured to periodically repeat a wake-up state and a sleep state, and to generate a wake-up signal when the charging sequence signal is input to the charge sequence port in the wake-up state;
    a second controller configured to operate in a wake-up state when the wake-up signal is generated during maintaining of a sleep state, and to control a charging operation of the electric vehicle in the wake-up state;
    a second power supply disposed between the first controller and the second controller, and configured to provide a second driving voltage to the second controller when the wake-up signal is generated;
    an opto-coupler disposed between the charge sequence port and the first power supply, and driven based on the first driving voltage to receive the charging sequence signal; and
    a coupler switch disposed between the opto-coupler and the first power supply and turned on/off according to the control of the first controller,
    wherein the charging sequence signal is selectively received in the wake-up state of the first controller.

2. The charging control device of claim 1, wherein the first controller includes a first period which is a period operating in the sleep state, and a second period which is a period operating in the wake-up state.

3. The charging control device of claim 2, wherein the first period is longer than the second period.

4. The charging control device of claim 1, wherein the opto-coupler is configured to provide the charging sequence signal to the first controller when the charging sequence signal is input in the wake-up state of the first controller.

5. The charging control device of claim 1, wherein the opto-coupler is configured to provide the charging sequence signal to the second controller when the charging sequence signal is input in the wake-up state of the second controller.

6. The charging control device of claim 1, wherein the first controller is configured to turn on/off the coupler switch periodically.

7. The charging control device of claim 1, wherein a cycle of turning on/off the coupler switch and a cycle of the wake-up/sleep state of the first controller are the same.

8. The charging control device of claim 1, wherein the first controller is configured to turn on the coupler switch at a time of starting the operation in the wake-up state, and to turn off the coupler switch before a time of ending the wake-up state.

9. The charging control device of claim 1, further comprising:
- a diode disposed between the first controller and the second power supply,
- wherein the diode is configured to enable the wake-up signal provided from the first controller to be provided to the second power supply, and
- wherein the diode is configured to prevent a current generated at the second power supply from flowing into the first controller.

10. The charging control device of claim 9, wherein the first controller is configured to periodically repeat the wake-up state and the sleep state in a state in which the second controller operates in the sleep state,
- wherein the second controller is an electronic controller (ECU) of the electric vehicle, and configured to control one or more of a motor of the electric vehicle, a braking system of the electric vehicle and a transmission of the electric vehicle, and
- wherein the first controller is an auxiliary controller configured to wake up the ECU of the electric vehicle.

* * * * *